US008838985B1

(12) United States Patent
Robbins (10) Patent No.: US 8,838,985 B1
(45) Date of Patent: Sep. 16, 2014

(54) METHOD AND APPARATUS FOR AUTHENTICATING STATIC TRANSCEIVER DATA AND METHOD OF OPERATING AN AIS TRANSCEIVER

(75) Inventor: Jeffrey M. Robbins, Auckland (NZ)

(73) Assignee: Vesper Marine Limited (NZ)

( * ) Notice: Subject to any disclaimer, the term of this patent is extended or adjusted under 35 U.S.C. 154(b) by 270 days.

(21) Appl. No.: 12/854,819

(22) Filed: Aug. 11, 2010

Related U.S. Application Data

(60) Provisional application No. 61/232,792, filed on Aug. 11, 2009.

(51) Int. Cl.
*H04L 29/06* (2006.01)
*G06F 21/00* (2013.01)

(52) U.S. Cl.
USPC ............... 713/182; 713/1; 713/100; 713/193; 340/851; 340/984; 340/996; 342/41; 342/113; 455/90.1; 701/301; 701/409; 701/467; 701/517; 701/519; 726/18; 726/19

(58) Field of Classification Search
CPC ...... H04W 12/00; H04W 12/06; G01S 7/003; G01S 13/9307
USPC ........................................................ 713/182
See application file for complete search history.

(56) References Cited

U.S. PATENT DOCUMENTS

| 4,903,243 | A | 2/1990 | Turner, Jr. | |
| 5,008,661 | A | 4/1991 | Raj | |
| 5,355,140 | A * | 10/1994 | Slavin et al. | 342/386 |
| 5,469,403 | A | 11/1995 | Young et al. | |
| 5,576,716 | A * | 11/1996 | Sadler | 342/357.75 |
| 5,661,804 | A * | 8/1997 | Dykema et al. | 380/274 |
| 5,838,227 | A | 11/1998 | Murray | |
| 5,955,981 | A * | 9/1999 | Rangan | 341/173 |
| 6,512,463 | B1 * | 1/2003 | Campbell et al. | 340/870.02 |
| 6,522,301 | B2 | 2/2003 | Takayama et al. | |
| 7,047,114 | B1 * | 5/2006 | Rogers | 701/21 |
| 7,139,647 | B2 * | 11/2006 | Larsen | 701/21 |
| 7,327,216 | B2 | 2/2008 | Ghabra et al. | |
| 7,646,298 | B1 * | 1/2010 | Osburn et al. | 340/539.26 |
| 7,751,977 | B2 * | 7/2010 | Winkler et al. | 702/3 |
| 7,817,079 | B1 * | 10/2010 | Funk | 342/41 |
| 7,876,865 | B2 * | 1/2011 | Peach | 375/343 |
| 7,929,959 | B2 * | 4/2011 | De Atley et al. | 455/418 |
| 7,979,088 | B2 * | 7/2011 | Miller | 455/558 |
| 7,999,656 | B2 * | 8/2011 | Fisher | 340/5.73 |
| 8,223,009 | B2 * | 7/2012 | Anderson et al. | 340/539.1 |
| 2001/0015692 | A1 * | 8/2001 | Takanori et al. | 340/5.23 |
| 2001/0056544 | A1 * | 12/2001 | Walker | 713/200 |

(Continued)

OTHER PUBLICATIONS

Sub-Committee on Radiocommunications and Search and Rescue, 10th session, Agenda item 10, COMSAR 10/10, Dec. 2, 2005, entire document, http://2001-2009.state.gov/documents/organization/58688.pdf.*

*Primary Examiner* — Kambiz Zand
*Assistant Examiner* — Ronald Baum
(74) *Attorney, Agent, or Firm* — Lowe Graham Jones PLLC (57) ABSTRACT

A method and apparatus which ensures that static data entered into a communications device or apparatus is accurate, or at least consistent with data provided to an authentication service. In some embodiments of the invention, the authentication service may maintain a database of static data associated with each communications apparatus and/or verify the validity of at least a portion of the static data.

31 Claims, 6 Drawing Sheets

(56) References Cited

U.S. PATENT DOCUMENTS

| | | |
|---|---|---|
| 2002/0164994 A1 | 11/2002 | Lundberg |
| 2003/0088784 A1* | 5/2003 | Ginter et al. ............... 713/189 |
| 2004/0160304 A1* | 8/2004 | Mosgrove et al. ......... 340/5.21 |
| 2004/0217900 A1* | 11/2004 | Martin et al. ............ 342/357.07 |
| 2004/0249818 A1* | 12/2004 | Isaac ........................... 707/10 |
| 2005/0200204 A1 | 9/2005 | Jonsson et al. |
| 2006/0095385 A1 | 5/2006 | Atkinson et al. |
| 2007/0005953 A1* | 1/2007 | Boman et al. ............... 713/100 |
| 2008/0003980 A1* | 1/2008 | Voss et al. .................. 455/411 |
| 2008/0088485 A1 | 4/2008 | Stolte et al. |
| 2008/0147257 A1 | 6/2008 | Kuhlgatz et al. |
| 2008/0305771 A1* | 12/2008 | Yajima et al. ............... 455/411 |
| 2009/0045983 A1 | 2/2009 | Miller |
| 2009/0102714 A1* | 4/2009 | Talbot et al. ............ 342/357.12 |
| 2009/0207050 A1 | 8/2009 | Arpin et al. |
| 2010/0045487 A1* | 2/2010 | Bamba ......................... 340/984 |

* cited by examiner

METHOD AND APPARATUS FOR AUTHENTICATING STATIC TRANSCEIVER DATA AND METHOD OF OPERATING AN AIS TRANSCEIVER

PRIORITY CLAIM

This application claims the benefit of U.S. Provisional Application Ser. No. 61/232,792 filed Aug. 11, 2009; the contents of which are incorporated by reference.

FIELD OF THE INVENTION

This invention relates to securely initializing a radio transceiver, for example an Automatic Identification System (AIS) transceiver, with static data such as identification numbers, and to methods of disabling and enabling features of such a device.

BACKGROUND OF THE INVENTION

Prior to being put into operation Automatic Identification System (AIS) Class A or Class B transceivers require static data such as, but not limited to, names, call signs, identification digits, service identifiers and mobile maritime service identifiers (MMSI) to be securely recorded within the transceiver. Regulatory or other restrictions are placed on end users to overcome problems associated with incorrect static data being recorded within transceivers. These restrictions require sellers or professional installers of transceivers to record this information within the transceiver before the end user may operate it.

One disadvantage of the approach which requires sellers or professional installers to record this information within the transceiver is that the information must be known and communicated to the seller by the end user at the time of sale. Another problem is that the seller must have personnel capable of recording this information within transceivers available at the place of sale. Yet another problem is that the seller must have personnel with sufficient time available to record this information within transceivers at the place of sale.

If a user wishes to transfer ownership of their transceiver they must send it back to the seller or installer so it can be "reset" with their static data removed.

SUMMARY OF THE INVENTION

It is an object of some versions of the invention to provide a method and apparatus for authenticating and storing within a transceiver end user entered static data which overcomes or ameliorates at least one disadvantage of the prior art.

A further object of some versions of the invention is to eliminate the need for sellers or professional installers of transceivers to record the static data. Rather the end user does it themselves yet the end user can be prevented from entering incorrect static data.

An additional object of some versions of the invention is for end users to be prevented from entering static data multiple times into a single transceiver or entering the same static information into multiple transceivers.

An additional object of some versions of the invention is for end users to have the ability to transfer ownership of a transceiver by erasing their static information and allowing the new owner to record their own static information within the transceiver.

A still further object of some versions of the invention is to provide a means by which an owner of the transceiver can activate one or more features of the transceiver when authorised by the issuer of the transceiver.

Alternatively, it is an object of some versions of the present invention to at least provide the public with a useful choice.

According to one broad aspect of the invention there is provided an Automatic Identification System (AIS) transceiver comprising:
  a data input interface allowing a user to input data comprising a code; and
  a processor configured to receive the data and to enable one or more disabled functions of the transceiver if the code is confirmed as authentic.

Preferably the data comprises static data and one of the disabled functions is storing the static data in a non-volatile memory.

Preferably one of the disabled functions is the ability to transmit a portion of the static data.

Preferably the data comprises encrypted static data.

Preferably the code comprises the encrypted static data.

Preferably the processor is configured to receive the static data, calculate a confirmation code based at least in part on the static data and encryption thereof using a secret key which is stored in the non-volatile memory, and to store the static data in the non-volatile memory if the confirmation code matches the authentication code.

Preferably the processor is configured to create a hash value from the static data which is then encrypted using the secret key.

Preferably the data comprises a nonce data string and the processor checks the authenticity of the nonce data string.

Preferably the data input interface comprises a data entry device integrated within the transceiver.

Preferably the data input interface comprises a communications interface provided in the transceiver and adapted to allow data communications with an external device.

According to a second aspect of the invention there is provided a method for enabling access to one or more disabled features of an Automatic Identification System (AIS) transceiver, the method comprising the steps of:
  receiving data comprising a code from an authorized source; and
  entering the data into the transceiver, whereupon one or more disabled functions of the transceiver are enabled if the code entered is confirmed by the transceiver as authentic.

Preferably the data comprises static data and one of the disabled features is storing the static data in a non-volatile memory of the transceiver.

Preferably one the disabled features is the ability to transmit a portion of the static data.

Preferably the data comprises encrypted static data.

Preferably the code comprises the encrypted static data.

Preferably the authorized source is an authentication service and the code is an authentication code, and the method further includes the steps of:
  providing information comprising the static data to the authentication service;
  receiving, from the authentication service, the authentication code, wherein the authentication code is based, at least in part, on the static data provided to the authentication service.

Preferably the transceiver is configured to receive the static data, calculate a confirmation code based at least in part on the static data and encryption thereof using a secret key which is stored in the non-volatile memory, and to store the static data in the non-volatile memory if the confirmation code matches the authentication code.

Preferably the code further comprises a serial number of the transceiver.

Preferably the code further comprises a nonce data string and the transceiver checks the authenticity of the nonce data string.

Preferably the step of entering the static data and the authentication code into the transceiver comprises entering the data into the transceiver via a data input interface.

Preferably the data input interface comprises an integrated data entry device.

Preferably the data input interface comprises a data communications interface adapted to interface with an external device.

Preferably method for authenticating static data recorded in an Automatic Identification System (AIS) transceiver, the method comprising the steps of:

providing information comprising said static data to an authentication service;

receiving, from the authentication service, an authentication code based, at least in part, on the static data provided to the authentication service; and entering the static data and the authentication code in the communications device, whereupon the static data is recorded by the communications device and one or more disabled functions of the communications device are enabled if the authentication code entered by the user matches a confirmation code calculated by the communications device based, at least in part, on the static data entered into the communications device by the user.

According to a further aspect of the present invention there is provided a method of authenticating static data for recordal in an Automatic Identification System (AIS) transceiver, the method comprising the steps of:

receiving, from a user of the communications device, information comprising said static data;

calculating, using a computing device, an authentication code based, at least in part, on the static data; and communicating the authentication code to the user, whereby the authentication code and static data may be entered into the communications device by the user, such that one or more functions of the communications device will be enabled if the static data entered into the communications device matches that upon which the authentication code is based.

According to a further aspect of the present invention there is provided an Automatic Identification System (AIS) transceiver comprising:

non-volatile memory in which a secret key is stored;

a data input interface allowing a user to input static data and an authentication code; and a processor configured to receive the static data, calculate a confirmation code based at least in part on the static data and encryption thereof using the secret key, and to store the static data in the non-volatile memory if the confirmation code matches the authentication code.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

In a preferred embodiment the present invention is directed toward a method and apparatus which ensures that static data entered into a communications device or apparatus is accurate, or at least consistent with data provided to an authentication service. In some embodiments of the invention, the authentication service may maintain a database of static data associated with each communications apparatus and/or verify the validity of at least a portion of the static data.

The invention will be described herein below with reference to an example of a preferred embodiment wherein the communications apparatus comprises an Automatic Identification System (AIS) Class A or Class B transceiver.

Because some transceivers, such as AIS transceivers, are important safety and homeland security devices it is important that the identification of the transceiver is correct and accurate. In an attempt to limit this problem, regulatory authorities such as the FCC have required that certain transceivers, such as AIS Class B, must have the static information loaded by authorized personnel such as sellers or professional installers of the transceiver and the end user must be prevented from loading this information themselves.

The AIS system is a tracking system used to identify and locate vessels. An AIS transceiver periodically transmits data representing certain fixed or static properties of the vessel such as the name of the vessel, radio call sign, MMSI, type of ship/cargo, and/or dimensions of the ship, in addition to variable data such as the speed and heading of the vessel, for example. As any AIS transceiver is associated with a particular vessel, it is important that the 'static' or constant identifying or descriptive data transmitted by the AIS transceiver is accurately recorded therein so that the vessel can be correctly identified from the AIS transmissions.

Accordingly, present FCC regulations require that static data is entered into a transceiver by authorized personnel upon purchase or installation of the transceiver, and that the data cannot be modified by the user. If the reseller does not have staff trained to record the static data it may be necessary for the transceiver to instead be shipped to the purchaser after the static data has been recorded at another time or place by an authorized person. This may be inconvenient or otherwise undesirable for the purchaser, and may discourage completion of the transaction. Another limitation is that this regulation does not necessarily prevent errors or inaccuracies in the static data being recorded in the transceiver, whether intentional or otherwise.

The method and apparatus of the present invention may be used to validate and/or authenticate the static data, such as call signs, identifications, station or vessel names, MMSI (Mobile Maritime Service Identifier), etc by any person while eliminating or at least minimizing the possibility of incorrect or inaccurate static data being loaded into the transceiver, and to prevent the transceiver broadcasting this erroneous information.

According to one preferred embodiment, the invention comprises a method in which the owner or user of the AIS transceiver first provides the required static data to an authentication service which preferably verifies the data and provides the user with an authentication code calculated using a deterministic procedure or algorithm based at least in part on the static data. The static data is entered by the user into the transceiver along with the authentication code. The transceiver, using the same deterministic procedure as the authentication service, also calculates an authentication code, referred to as the confirmation code, based on the static data entered into the transceiver by the user. If the authentication code and confirmation code match, confirming that the user provided the same data to both the authentication service and the transceiver, the static data is recorded by the transceiver and a transmitter is enabled.

This preferred embodiment will be described in further detail below. It should be appreciated that while the description refers to a number of possible variations of the method and/or apparatus, further variations or modifications are possible without departing from the scope of the invention.

Throughout the drawings, like reference numerals will be used to refer to like features in different drawings and/or embodiments.

Figure 1:
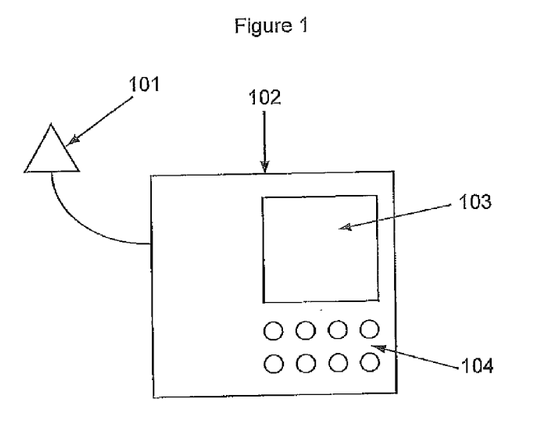
FIG. 1 is a block diagram of a transceiver according to one embodiment of the invention.

FIG. 1 illustrates the component blocks for a communications apparatus according to the invention, in the form of transceiver 102 with an integrated display 103 and a data input interface such as a plurality of keys 104 provided in a keypad for operating the device and entry of static data. The number of keys varies in the different embodiments of the invention or the data input interface may alternatively comprise an integrated data entry device such as a touch screen display or other equivalent means for entering alphanumeric characters. One or more antennas 101 are attached to the transceiver 102 for the purpose of reception and transmission. The user interfaces directly with the transceiver 102 using the display 103 and keys 104 to enter the static data which may include the name, identification, MMSI (Mobile Maritime Service Identifier) and other relevant information.

Figure 2:
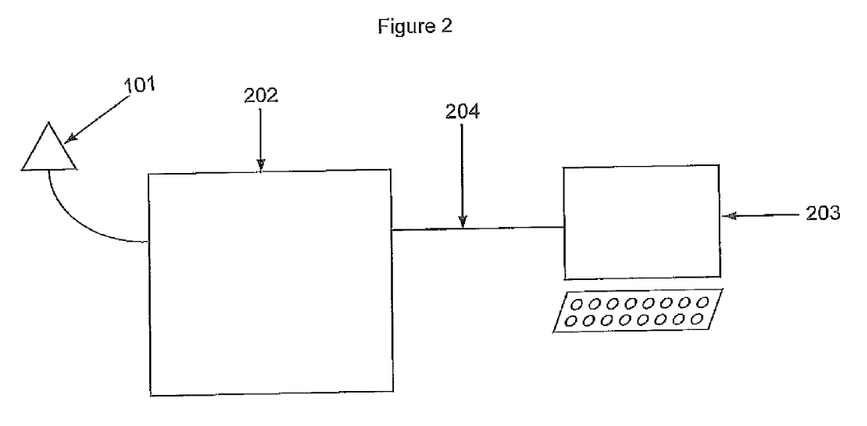
FIG. 2 is a block diagram of transceiver according to a further embodiment of the invention.

FIG. 2 illustrates the component blocks for an alternative embodiment of a communications apparatus in the form of transceiver 202 with an antenna 201 for the purpose of reception and transmission. A data connection 204 is alternatively, or additionally, used to connect the transceiver 202 with an external data entry device 203 which may be a computer or other data terminal equipment. In this embodiment the data input interface may be said to comprise a communications interface enabling input of data into the apparatus using an external device such as a computer or keyboard, for example. In the preferred embodiment, the data connection uses USB, but the communications interface may alternatively include one or more of RS232, RS422, NMEA-2000, Ethernet or any other wired or wireless standard or proprietary communications technology. In the descriptions which follow it is not necessary to distinguish whether the information is entered directly though an integrated display unit and/or data entry device or entered through a communications interface. For the purposes of the invention both methods of data entry are the same.

Figure 3:
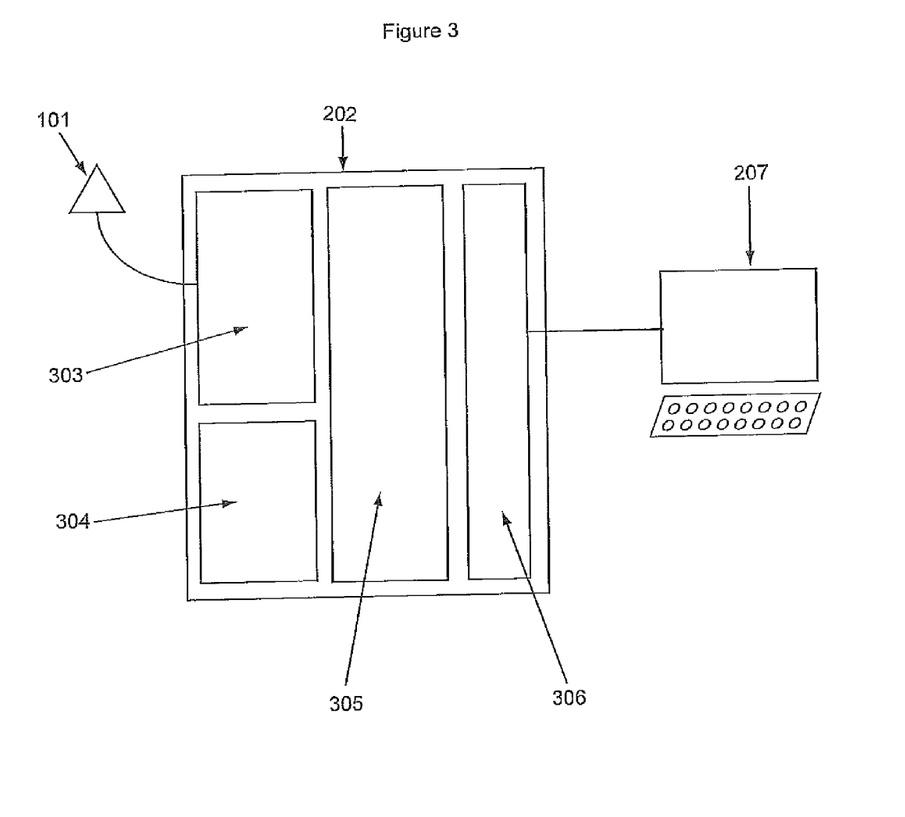
FIG. 3 is a block diagram of the major components within a transceiver according to the invention.

FIG. 3 illustrates the major components contained within an example transceiver 102 or 202 according to the present invention. An antenna 101 is used for reception and transmission and is connected to a radio section 303 which contains one or more radio receivers and one or more transmitters which are built using designs and techniques known to those skilled in the art. A control circuit 305 is comprised of one or more processing devices such as but not limited to a microprocessor, microcontroller, DSP or FPGA which performs the necessary operations for controlling the transceiver and storing the static data in a non-volatile memory 304 comprising an EEPROM or flash memory module, for example. The non-volatile memory may also be incorporated within the control circuit 305. The designs and techniques for the control circuit and non-volatile memory are known to those skilled in the art. Connected to the control circuit 305 is an interface circuit 306 which provides the interface between the internal or external display and keys depicted in this figure as external device 207. In another embodiment, as previously described, the display and keys 307 are contained within the transceiver enclosure in which case the interface circuit 306 may comprise a communications interface. The designs and techniques for the interface circuit 306 are known to those skilled in the art. Software or firmware executes within the control circuit 305 which performs the necessary steps to accept and authenticate the static data entered by the user via the interface circuit and if the authentication is successful the static data is stored in the non-volatile memory 304. Those skilled in the art will appreciate that many variations of the transceiver hardware are possible without departing from the scope of the invention, and the above configuration is described by way of example only.

Figure 4:
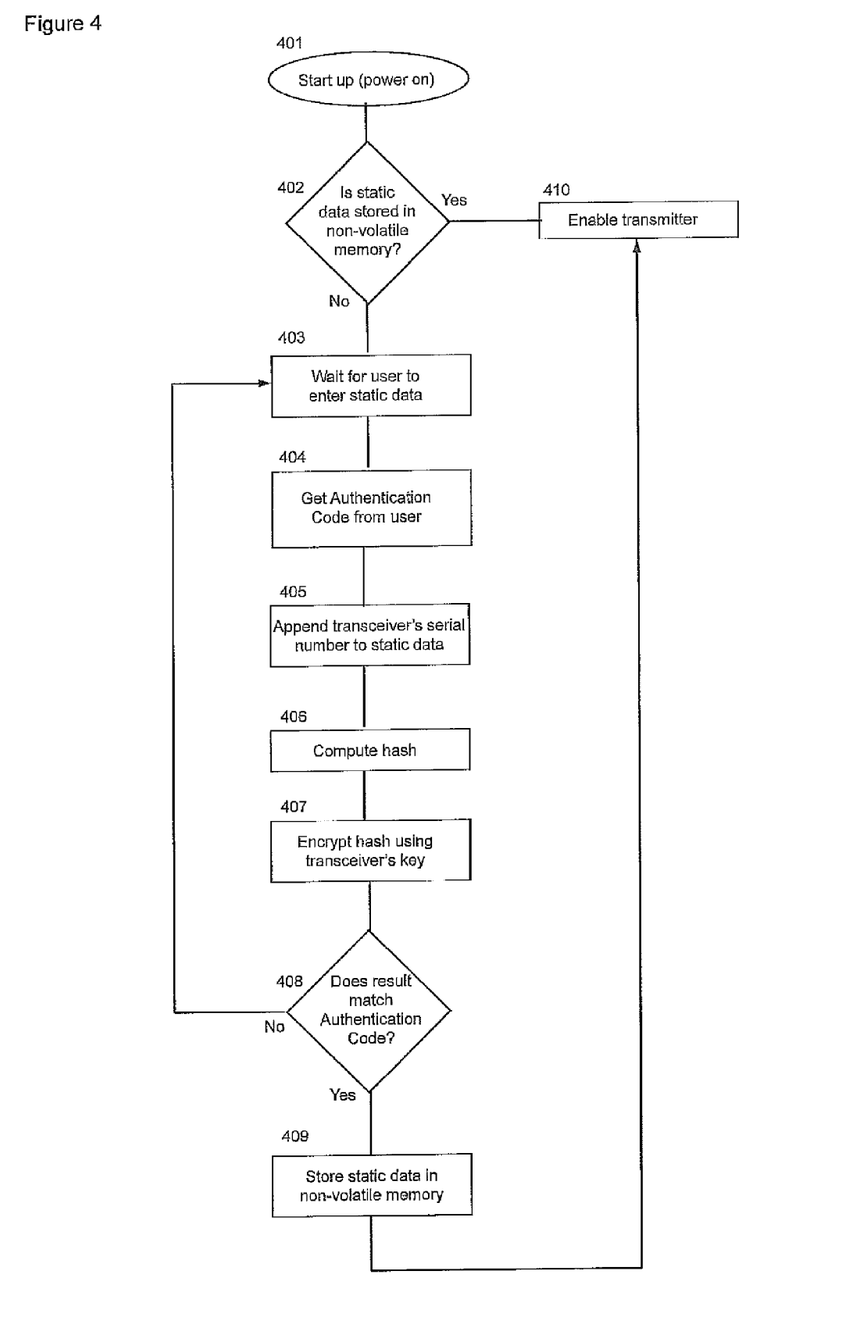
FIG. 4 is a flow chart showing the processing method within a transceiver during static data authentication according to one embodiment of the invention.

FIG. 4 is a flow chart showing the method employed by the transceiver to accept and authenticate the static data being entered by the user. At start-up 401 for the first time the transceiver has no static data 402 and will wait 403 for the user to enter the data. According to the preferred embodiment, one or more functions of the transceiver are disabled until the static data is recorded in the transceiver. In this example, one or more of the transmitters will be disabled.

At the time the user has entered their static data they will also enter an authentication code 404, received from an authentication service described in further detail herein below.

The transceiver calculates a confirmation code, corresponding with the authentication code received from the authentication service, based at least in part on the static data entered by the user. It may append or combine to the static data the serial number 405 which is a number uniquely assigned to the transceiver and stored permanently in non-volatile memory. In alternative embodiments, it is not necessary to append or combine the serial number with the static data. This might be the case where each transceiver is assigned its own unique encryption key by the manufacturer, which is also stored in non-volatile memory. Inclusion of a unique serial number, or encrypting using a secret key, ensures that the authentication code or confirmation code (described in further detail below) cannot be used to record and authenticate the same static data in another transceiver.

The serial number and/or static data forms a block of data for which a deterministic function such as a hash function 406 such as SHA-1, SHA-2, MD5 or any other hash function as will be known to persons skilled in the art, is preferably executed to form a hashed value which corresponds to the contents of the aggregate of the static data and possibly transceiver serial number. The purpose of the hash is to reduce the typically longer and variable length data block to a fixed and smaller datum which is suitable for encryption and subsequently producing a shorter and easier to enter authentication code. Any alternative method for achieving this can be used without departing from the scope of the invention or alternatively the step may be omitted and a variable-length datum dependent on the static data may be used.

The resulting hashed value may be truncated or otherwise manipulated in a manner known to persons skilled in the art to achieve a suitable number of bits for encryption and subsequent display to the user. The transceiver preferably encrypts 407 the hashed value using a secret key which is stored permanently in non-volatile memory within each transceiver.

In the preferred embodiment the key is unique to the transceiver, or at least shared with only a small proportion of such transceivers produced by the manufacturer. In alternative embodiments the same key may be used in multiple transceivers, at the risk of reduced security. The purpose of the encryption operation is to ensure that a user cannot easily produce a correct authentication code by any other manner other than interacting with the authentication service. A given authentication code is therefore a function of the static data entered by the user, in some cases the transceiver's serial number, the hash function and the encryption key. The encryption key serves as the "secret" element which prevents a user from generating an authentication code. This key may be the same for many or all transceivers and in this case it is necessary to append or otherwise combine the transceiver's serial number with the static data to ensure a different Authentication Code is produced if the same static data is to be loaded into a different transceiver. In the preferred embodiment, each transceiver has its own unique encryption key which is kept secret in both the transceiver and the authentication service.

The result of the encryption operation may be truncated or otherwise manipulated in a manner known to persons skilled in the art to achieve a more easily displayed or entered code. The type of encryption such as symmetric or asymmetric and the specific algorithm such as but not limited to 3DES, RC4, AES, initialization vectors, and chaining method may vary in different embodiments of the invention. The resulting confirmation code is compared to the authentication code entered by the user and received from the authentication service. If the two codes match then the static data is considered authentic and stored within the non-volatile memory of the transceiver 409. At this point, the transceiver will enable the transmitter 410.

Although many variations are possible in the method or algorithm for producing the authentication code, it will be apparent to those skilled in the art that the embodiment described above (i.e. hashing and encryption) possesses several qualities which are at least desirable in this particular application. The authentication code is calculated deterministically in such a way that any small change to the data results in a different code, generation of the authentication code can be repeated by both the authentication service and the transceiver, the authentication code is relatively short in relation to the information provided by the user (which includes the static data and, potentially, the transceiver serial number), the correct code cannot easily be created except using the authentication service, and the static data cannot be extracted from the code. Some or all of these properties may be desirable in other applications, while others may not be necessary. Thus, any suitable authentication code generation algorithms may be used in accordance with the invention provided that the code is based at least in part on the information provided by the user which is to be recorded in the transceiver. Other variations are possible depending on the level of security and other such requirements of a particular application of the invention.

Figure 5:
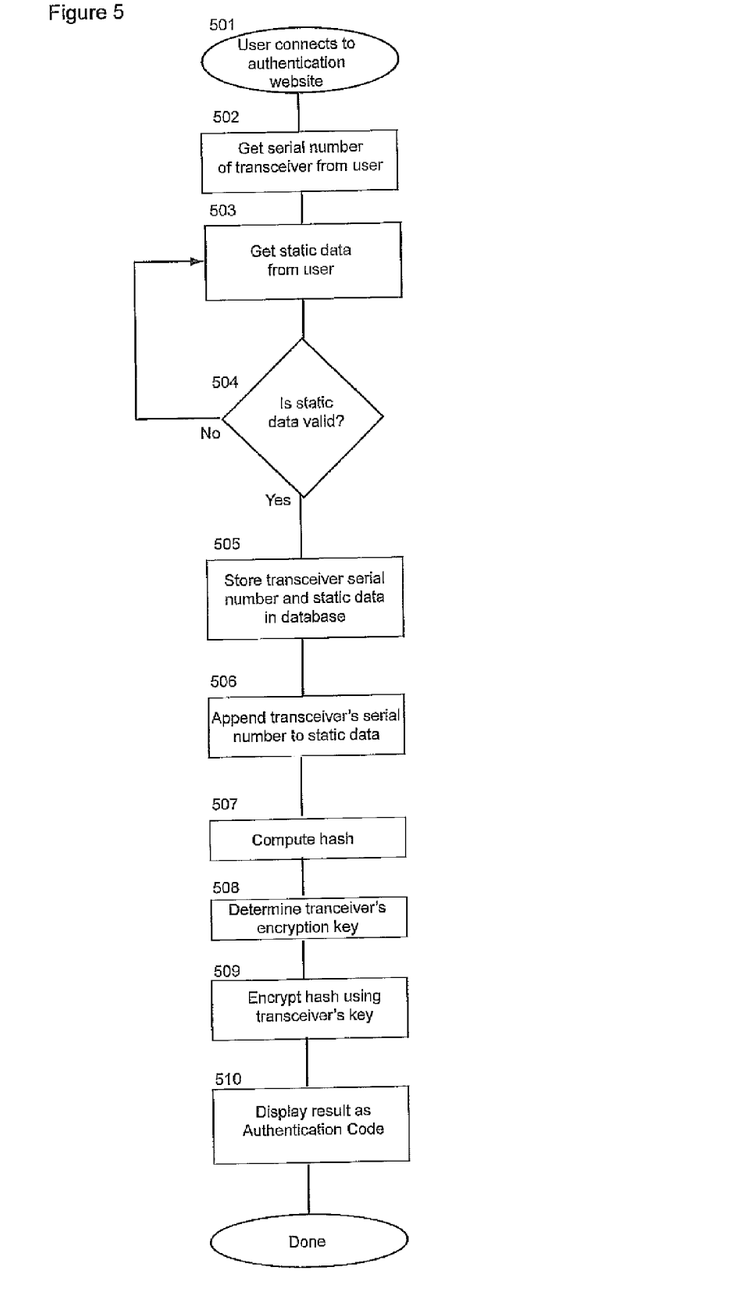
FIG. 5 is a flow chart showing the processing method within a website or server during static data entry and authentication according to the invention.

FIG. 5 is a flow chart showing the method employed by the authentication service which in the preferred embodiment comprises a website and server system but in other embodiments may comprise a telephone system, kiosk, or other such system. The authentication service accepts or receives the serial number of the transceiver from the user 502 and/or the static data the user will be entering into the transceiver 503. The authentication service will preferably perform validation 504 and authenticity checks on the static data against on-line licensing and/or other databases to ensure its accuracy. In the preferred embodiment it will also verify the static data has not been loaded into another transceiver by checking a database maintained by the Authentication Service. It may also verify the data by checking that the format of the static data matches that expected (i.e. the required fields are all provided and in the correct format). Once the data has been verified the transceiver serial number and static data is preferably stored in a database 505 for subsequent checking as described above and also for the purposes of an audit trail or for other reasons that may be necessary to administer the authentication service or radio licensing in general. If the data does not appear to be correct, the user will be notified and no authentication code will be provided.

In other embodiments of the invention, verification of the static data may not be necessary, as the invention may be used merely to ensure consistency between data provided to the authentication service and entered into a transceiver, for example.

Assuming the static data appears to be correct, the authentication service implements a deterministic algorithm to calculate an authentication code. This algorithm should be identical to that performed by the transceiver as described above, although those skilled in the art will appreciate that this may not necessarily be the case. The transceiver serial number may be appended or combined with the static data entered by the user to form a block of data 506. Whether it is necessary to perform this step and the manner in which the data is appended or combined will match the method used by the transceiver as described above. The resulting data block will, according to the preferred embodiment, have a hash function executed over it to form a hashed value 507 which corresponds to the contents of the data block. The resulting hashed value may be truncated or otherwise manipulated to achieve a suitable number of bits for encryption and subsequent display to the user. The authentication service then preferably encrypts 509 the hashed value 507. The encryption key used will depend on the particular embodiment of the invention. In the preferred embodiment where each transceiver has a unique secret key, the authentication service will retrieve the secret key corresponding with a transceiver serial number received from the user by performing a lookup in a database based on the transceiver serial number 508. The result of the encryption operation may be truncated or otherwise manipulated in a manner known to persons skilled in the art to achieve a more easily displayed or entered code. The type of encryption such as symmetric or asymmetric and the specific algorithm, such as but not limited to 3DES, RC4, AES, initialization vectors, and chaining method may vary in different embodiments of the invention. The final result is displayed to the user as the authentication code 510 for entry into the transceiver as described above.

An additional purpose of the invention is to allow end users to more easily transfer their transceiver to another owner by removing their static information from the transceiver prior to transferring ownership. According to the methods of the prior art, transferring ownership of such a communications apparatus requires the apparatus to be returned to the retailer, installer, manufacturer, or some other person authorized to modify the static data, as the user is prevented from modifying the static data recorded in the transceiver.

Figure 6:
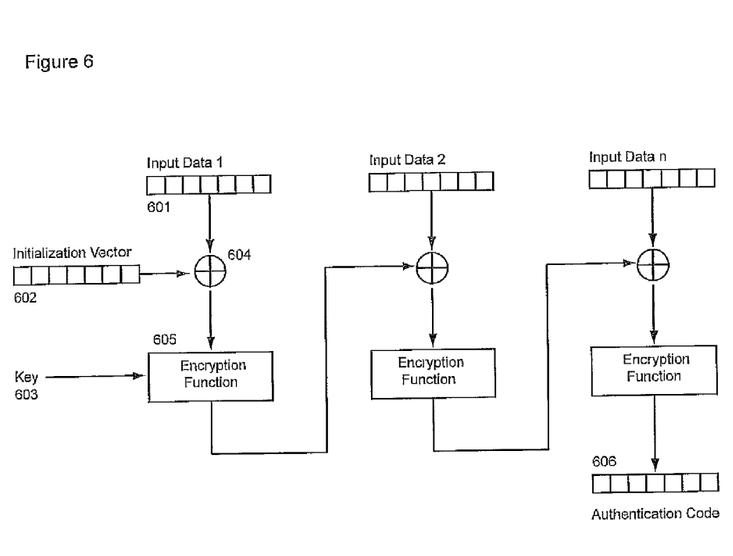
FIG. 6 shows the process of performing an alternative form of encryption for computing the Authentication Code.

FIG. 6 illustrates one example of an alternative method of computing the authentication and confirmation codes according to the invention. It is an alternative to hashing the data and encrypting it. In this alternative method the input data 601 is represented as smaller blocks of data which correspond in size to the encryption block size and is dependent on the specific encryption algorithm being employed. The process begins with the modulo-2 addition 604 of a fixed and known Initialization Vector 602 (often all zeroes) with the first block of input data. The result is then encrypted 605 with the appropriate key 603, as described above. The result of this encryption is combined with the next block of input data using modulo-2 addition 604 and this result is then encrypted 605. The process proceeds until there are no more blocks of input data. The final result block 606 is used as the authentication code. The authentication code may be truncated or otherwise manipulated in a manner known to persons skilled in the art to achieve a more easily displayed or entered code. Any other such standard or proprietary method of producing a suitable authentication code may alternatively be substituted without departing from the scope of the invention.

Figure 7:
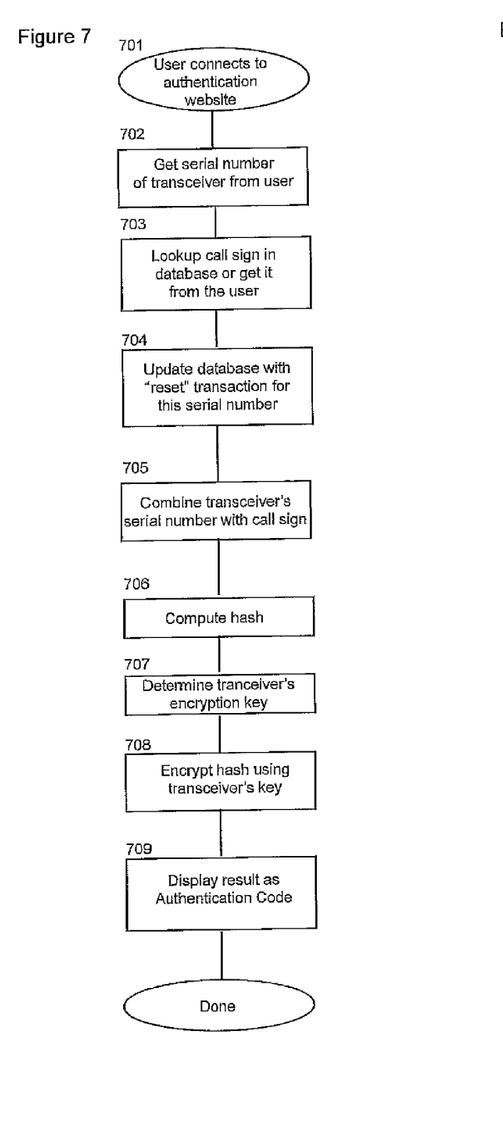
FIG. 7 is a flow chart showing the processing method within a website or server when a user wishes to "reset" their transceiver to its original unassigned state facilitating the transfer or sale of the transceiver to another party.

FIG. 7 is a flow chart showing an example method employed by the authentication service to perform a "reset" of a transceiver according to the present invention. The reset is done to facilitate the transfer or sale of a transceiver and erases the static data in preparation for a new owner to load new static data. The authentication service accepts the serial number of the transceiver from the user 702 and locates the transceiver's call sign, identification or MMSI within its database. In alternative embodiments of the invention this information is entered by the user rather than located within a database. The type of call sign, MMSI or other identification varies in different embodiments of the invention. In the preferred embodiment, the database of transceiver static data is updated to reflect the reset operation for subsequent lookups 704. The transceiver's serial number is appended or combined with the transceiver's call sign, identification or MMSI to form a data block from which an authentication code is produced, as described above. In alternative embodiments, the transceiver's identification is not included. The resulting data block will have a hash function such as SHA-1, SHA-2, MD5 or other hash function as known to persons skilled in the art, executed over it to form a hashed value 706 which corresponds to the contents of the data block. The resulting hashed value may be truncated or otherwise manipulated in a manner known to persons skilled in the art to achieve a suitable number of bits for encryption and subsequent display to the user. The Authentication Service encrypts 708 the hashed value using a key determined by the transceiver serial number 707. The key used will depend on the embodiment of the transceiver in the same manner as described previously. In the preferred embodiment where each transceiver has a unique secret key, the Authentication Service will retrieve the secret key to use by performing a lookup in a database based on the transceiver serial number 707. The final result is displayed to the user as the Authentication Code 709.

Figure 8:
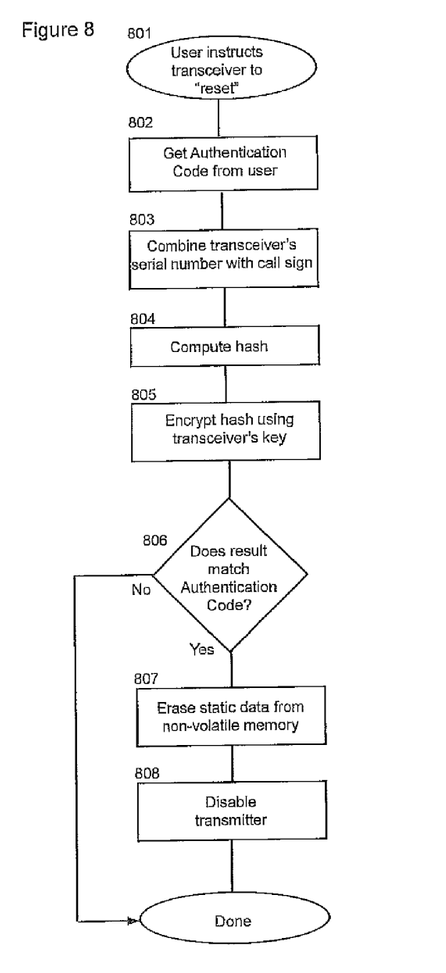
FIG. 8 is a flow chart showing the processing method within a transceiver when a user wishes to "reset" it to its original unassigned state facilitating the transfer or sale of the transceiver to another party.

FIG. 8 is a flow chart showing the method employed by the transceiver to perform a "reset". The reset effectively returns the transceiver to its uninitialized state preventing it from transmitting any longer until such time as it is reloaded with new static data corresponding to its new order. The user gives the transceiver a command to reset and enters the Authentication Code the user received from the Authentication Service 802. In the same manner as performed by the Authentication Service, the transceiver's serial number is appended or combined with the transceiver's identification such as call sign or MMSI which is stored within its non-volatile memory to form a data block 803. In alternative embodiments, the transceiver's identification is not included. The resulting data block will preferably have a hash function such as SHA-1, SHA-2, MD5 or other hash function executed over it to form a hashed value 804 which corresponds to the contents of the data block. The resulting hashed value may be truncated or otherwise manipulated to achieve the required number of bits for encryption and subsequent display to the user. The transceiver encrypts 805 the hashed value using a secret key which is stored permanently in non-volatile memory within each transceiver. In the preferred embodiment the key is unique to the transceiver. However in alternative embodiments the same key may be used in multiple transceivers. The result is a confirmation code which is compared with the Authentication Code entered by the user. If the two match then the static data is erased within the non-volatile memory of the transceiver 807 and the transmitter and/or other functions of the transceiver are disabled 808. At this point, the transceiver is effectively put back into its original non-initialized state and will await being loaded with new static data. In the interim, the transmitter will remain disabled.

According to an alternative embodiment, the static data (potentially also including the serial number) may simply be encrypted and displayed to the user for entry in the communications apparatus for decryption and recordal. However, the code in this case is likely to be a long string of seemingly random alphanumeric characters and may therefore be more prone to errors upon entry into the apparatus than might be the case if the user enters the static data directly into the transceiver accompanied by a short authentication code.

Nevertheless, embodiments in which the code is based around an encryption of the static data are possible, and can also be used to enable disabled features of the transceiver. For example, in one embodiment the data that is encrypted may include data which the transceiver can check, such as its serial number, a constant number, or a checksum over the data. After the transceiver has decrypted the data it checks to see if it is correct (e.g. matches the serial number or the constant or the checksum computed over the data). This ensures that the data has been properly decrypted and therefore the transceiver can confirm that only some other device (e.g. the authentication service) that knows its key has done the encryption.

To control features in the transceiver, the encrypted data could include which feature(s) are to be enabled along with the "known" datum above and/or any static data. The transceiver determines the authenticity of the code by decrypting it and checking for the "known" datum. If it decrypts properly then the transceiver can confirm that the data was encrypted by the authentication service since that is the only entity that also knows the transceiver's key.

In one embodiment the code provided by the authentication service may have a "nonce" data string attached to it in order to prevent a user from re-entering a code corresponding to a previously used set of static data into the transceiver without the knowledge of the authentication service. This is done to prevent the user of the transmitter from swapping between two or more identities. The nonce may be a sequential number that the authentication server stores a record of. Every time the authentication service creates an authentication code for a given transceiver it increments the nonce for that specific device and includes it in the data being encrypted. The transceiver does the same thing, and can therefore confirm that the data entered is a newly generated code and not a previously used one.

In an asymmetric encryption scheme, for example a public/private key pair, the authentication server encrypts the data using the transceiver's public key. The only way to decrypt the data is using the transceiver's private or secret key component of the pair. The transceiver determines that the decryption was done properly by checking for the known datum, checksum or similar. This ensures that the code can only be read by the device and that the data has been properly encrypted with the correct public key. A nonce may also be used, as is described above.

In order to prevent another entity from forging a message using the public key, the authentication service can "sign" the message. This may be done with public/private keys. The authentication service has a key pair for which the transceiver knows the public key and only the authentication service knows the private key. The authentication service may create a hash or digest of the original unencrypted message and encrypt that hash or digest using its private (aka secret) key to form a "signature" which is sent along with the message.

The device decrypts the message normally and computes the same hash/digest. It then decrypts the signature using the authentication service's public key and compares the two. If they match, then the device knows that the message could only have been sent by the authentication service because that is the only party that knows the authentication service's private key and therefore the only party that could have created the signature.

In one embodiment of the invention the step of enabling of one or more features may be independent of the step of entering static data. In these embodiments the transceiver may be manufactured with a range of features, such as the ability to broadcast information as well as receiving information. One or more of these features may be enabled at the time of purchase, optionally leaving others disabled. However, it may be possible for an authorized agent to allow the owner or user to enable further features on payment of a fee. The fee may be a onetime payment, or it may be an ongoing license fee.

When the owner or user wishes to upgrade the functionality of the transceiver they contact an authorized agent. The agent then provides a code for entry into the transceiver using one of the methods described above. In some embodiments the code may be based at least in part on the static data to be entered into the transceiver and/or the serial number of the transceiver, but in other embodiments it may simply be a code which is unique to that transceiver, or at least one which the transceiver can confirm as authentic, for example by using one of the methods described above.

In one embodiment the transceiver is sold having only receiving functionality, and can be upgraded in the manner described above to transmit selected types of data only, or all possible types of data.

From the foregoing it will be seen that preferred embodiments of the invention provide a method and apparatus for ensuring the validity (or at least consistency) of identifying or other static data, which allows important information to be correctly recorded in a communications apparatus with minimal risk for intentional or unintentional modification of the data. The method therefore satisfies requirements that the user or third parties be prevented from misusing a communications apparatus by modifying the static data reported therein. The user may enter the data themselves rather than require the services of a salesperson or installer for example, and can therefore take the communications apparatus with them and potentially install it themselves immediately upon purchase, which may not have otherwise been the case.

Although the invention has been described by way of example and with reference to possible embodiments thereof, it is to be understood that modifications or improvements may be made thereto without departing from the scope of the invention. Furthermore, where reference has been made to specific components or integers having known equivalents, then such equivalents are herein incorporated as if individually set forth.

Any discussion of the prior art throughout the specification should in no way be considered as an admission that such prior art is widely known or forms part of common general knowledge in the field.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

The embodiments of the invention in which an exclusive property or privilege is claimed are defined as follows:

1. A method for validating marine vessel data associated with a marine vessel and for transmission by an Automatic Identification System (AIS) transceiver installed on the marine vessel, the method comprising:
   receiving marine vessel identification data from a user of the AIS transceiver at an authentication service;
   authenticating the received marine vessel identification data at the authentication service;
   encrypting the marine vessel identification data at the authentication service;
   transmitting the encrypted marine vessel identification data at the authentication service;
   receiving the encrypted marine vessel identification data at the AIS transceiver;
   decrypting the marine vessel identification data at the AIS transceiver;
   the AIS transceiver storing the marine vessel identification data in order to enable transmitting of the marine vessel identification data by the AIS transceiver, and
   the AIS transceiver transmitting the decrypted marine vessel identification data while installed on the marine vessel;
   wherein the marine vessel identification data comprises a Maritime Mobile Service Identifier (MMSI) of the marine vessel.

2. The method according to claim 1, wherein authenticating comprises matching the marine vessel identification data against marine vessel identification data associated with the marine vessel and held in a database available to the authentication service.

3. The method according to claim 2, further comprising receiving a serial number of the AIS transceiver and associating this with the marine vessel identification data held in a database available to the authentication service.

4. The method according to claim 1, wherein the marine vessel identification data comprises one or more of the following a name of the marine vessel, a radio call sign of the marine vessel, a type of the marine vessel, and dimensions of the marine vessel.

5. The method according to claim 1, further comprising adding one or more of the following to the marine vessel identification data: a serial number of the AIS transceiver; a nonce; a signature.

6. The method according to claim 1, wherein authenticating comprises one or more of the following: verify the format of the marine vessel identification data; check that the marine vessel identification data is not already in use by another AIS transceiver; verify that the Maritime Mobile Service Identity (MMSI) has been assigned to the marine vessel; verify that the marine vessel identification data corresponds to the marine vessel.

7. A method for validating marine vessel identification data associated with a marine vessel and for transmission by an Automatic Identification System (AIS) transceiver installed on the marine vessel, the method comprising:
receiving marine vessel identification data from a user of the AIS transceiver at an authentication service;
authenticating the received marine vessel identification data at the authentication service;
processing the marine vessel identification data including using encryption at the authentication service;
transmitting the encrypted marine vessel identification data by the authentication service;
receiving the processed marine vessel identification data at the AIS transceiver;
the AIS transceiver storing the marine vessel identification data in order to enable transmitting of the marine vessel data by the AIS transceiver; and
the AIS transceiver transmitting unencrypted marine vessel identification data while installed on the marine vessel, the marine vessel identification data being unencrypted;
wherein the marine vessel identification data comprises a Maritime Mobile Service Identifier (MMSI) of the marine vessel.

8. The method according to claim 7, further comprising:
receiving marine vessel identification data at the AIS transceiver from a user;
processing the marine vessel identification data received at the AIS transceiver including using encryption;
matching the marine vessel identification data processed at the AIS transceiver with the processed marine vessel identification data received from the authentication service before transmitting unencrypted marine vessel identification data.

9. The method according to claim 7, wherein the processing further includes one or more of the following: generating a hash of the marine vessel identification data at both the authentication service and the AIS transceiver, adding a serial number of the AIS to the marine vessel identification data, adding a nonce to the marine vessel identification data, and adding a signature to the marine vessel identification data.

10. The method according to claim 7, wherein the marine vessel identification data comprises one or more of the following: a name of the marine vessel, a radio call sign of the marine vessel, a type of the marine vessel; dimensions of the marine vessel.

11. A marine vessel data identification validation and transmission system comprising:
an authentication server configured to receive marine vessel identification data from a user;
the authentication server further configured to encrypt the marine vessel identification data in response to the marine vessel data being authenticated;
an Automatic Identification System (AIS) transceiver configured to receive the encrypted marine vessel identification data;
the AIS transceiver further configured to decrypt the marine vessel identification data, and to store the marine vessel identification data;
the AIS transceiver further configured to transmit decrypted marine vessel identification data while installed on the marine vessel;
wherein the marine vessel identification data comprises a Maritime Mobile Service Identifier (MMSI) of the marine vessel.

12. The system according to claim 11, wherein the authentication service is further arranged to match the marine vessel identification data against marine vessel identification data associated with the marine vessel and held in a database available to the authentication service.

13. The method according to claim 11, wherein the marine vessel identification data comprises one or more of the following: a name of the marine vessel, a radio call sign of the marine vessel, a type of the marine vessel, and dimensions of the marine vessel.

14. A marine vessel identification data validation and transmission system comprising:
an authentication server configured to receive marine vessel identification data from a user;
the authentication server further configured to process the marine vessel identification data in response to the marine vessel identification data being authenticated, the process including encryption;
an Automatic Identification System (AIS) transceiver configured to receive the processed marine vessel identification data;
the AIS transceiver further configured to store marine vessel identification data in order to enable transmitting of the marine vessel data by the AIS transceiver; and
the AIS transceiver further configured to transmit marine vessel identification data while installed on the marine vessel, the marine vessel identification data being unencrypted and comprising a Maritime Mobile Service Identifier (MMSI) of the marine vessel.

15. The system according to claim 14, wherein the AIS is further arranged to:
receive marine vessel identification data at the AIS transceiver from a user;
process the marine vessel identification data received at the AIS transceiver including using encryption; and
match the marine vessel identification data processed at the AIS transceiver with the processed marine vessel identification data received from the authentication service before transmitting unencrypted marine vessel identification data.

16. The system according to claim 15, wherein the processing performed by the authentication service and the AIS transceiver further includes one or more of the following: generating a hash of the marine vessel identification data; adding a serial number of the AIS transceiver to the marine vessel identification data; adding a nonce to the marine vessel identification data; adding a signature to the marine vessel identification data.

17. A method for authenticating marine vessel identification data associated with a marine vessel and for transmission by an Automatic Identification System (AIS) transceiver installed on the marine vessel; the method comprising:
  providing the marine vessel identification data to an authentication service;
  receiving by the AIS transceiver encrypted marine vessel identification data from the authentication service; and
  the AIS transceiver decrypting and storing the marine vessel identification data in order to enable transmission of the marine vessel identification data by the AIS transceiver;
  the AIS transceiver further transmitting the decrypted marine vessel identification data while installed on the marine vessel;
  wherein the marine vessel identification data comprises a Maritime Mobile Service Identifier (MMSI) of the marine vessel.

18. The method according to claim 17, wherein the marine vessel data comprises one or more of the following: a Maritime Mobile Service Identity (MMSI) of the marine vessel, a name of the marine vessel, a radio call sign of the marine vessel, a type of the marine vessel, and dimensions of the marine vessel.

19. The method according to claim 17, further comprising receiving with the encrypted marine vessel identification data one or more of the following: a serial number of the AIS transceiver; a nonce; a signature.

20. A method for authenticating marine vessel identification data associated with a marine vessel and for transmission by an Automatic Identification System (AIS) transceiver installed on the marine vessel; the method comprising:
  providing the marine vessel identification data to an authentication service;
  receiving marine vessel identification data from a user of the AIS transceiver;
  receiving processed marine vessel identification data from the authentication service;
  the AIS transceiver processing the marine vessel identification data from the user using encryption;
  the AIS transceiver storing the marine vessel identification data in order to enable transmitting of the marine vessel data by the AIS; and
  the AIS transceiver transmitting the marine vessel identification data while installed on the marine vessel in response to determining that the received processed marine vessel identification data from the authentication service matches the processed marine vessel identification data from the user;
  wherein the marine vessel identification data comprises a Maritime Mobile Service Identifier (MMSI) of the marine vessel.

21. The AIS transceiver according to claim 20, wherein the processing comprises one or more of the following: encrypting the marine vessel identification data; hashing the marine vessel identification data; generating a digital signature from the marine vessel identification data.

22. The method according to claim 20, wherein the marine vessel data comprises one or more of the following: a name of the marine vessel, a radio call sign of the marine vessel, a type of the marine vessel, and dimensions of the marine vessel.

23. The method according to claim 20, further comprising receiving with the processed marine vessel identification data one or more of the following: a serial number of the AIS transceiver; a nonce; a signature.

24. A marine Automatic Identification System (AIS) transceiver for a marine vessel comprising:
  a non-volatile memory; and
  a control circuit comprising a processing device configured to:
  receive encrypted marine vessel identification data including the Maritime Mobile Service Identity (MMSI) of the marine vessel, the marine vessel data having been provided by a user of the AIS transceiver and authenticated by an authentication service;
  decrypt the marine vessel identification data;
  store the marine vessel identification data in order to enable transmitting of the marine vessel data by the AIS transceiver; and
  transmit the decrypted marine vessel identification data while installed on the marine vessel;
  wherein the marine vessel identification data comprises a Maritime Mobile Service Identifier (MMSI) of the marine vessel.

25. The marine AIS transceiver according to claim 24, wherein the processing device is further configured to receive and process one or more of the following before transmitting decrypted marine vessel identification data: a serial number of the AIS transceiver, a nonce, and a signature.

26. The AIS transceiver according to claim 24, wherein the marine vessel data comprises one or more of the following: a name of the marine vessel, a radio call sign of the marine vessel, a type of the marine vessel, and dimensions of the marine vessel.

27. The AIS transceiver according to claim 24, wherein the processing device is further configured to receive with the encrypted marine vessel identification data one or more of the following: a serial number of the AIS transceiver; a nonce; a signature.

28. A marine Automatic Identification System (AIS) transceiver for a marine vessel and comprising:
  a non-volatile memory; and
  a control circuit comprising a processing device configured to:
  receive marine vessel identification data from a user;
  receive processed marine vessel identification data from an authentication service process the marine vessel identification data from the user using encryption; and
  store the marine vessel identification data in response to determining that the received processed marine vessel identification data from the authentication service matches the processed marine vessel identification data from the user in order to enable transmitting of the marine vessel data by the AIS transceiver; and
  transmit decrypted marine vessel identification data while installed on the marine vessel;
  wherein the marine vessel identification data comprises a Maritime Mobile Service Identifier (MMSI) of the marine vessel.

29. The AIS transceiver according to claim 28, wherein the processing comprises one or more of the following: encrypting the marine vessel identification data, hashing the marine vessel identification data, and generating a digital signature from the marine vessel identification data.

30. The AIS transceiver according to claim 28, wherein the marine vessel data comprises one or more of the following: a name of the marine vessel, a radio call sign of the marine vessel, a type of the marine vessel, and dimensions of the marine vessel.

31. The AIS transceiver according to claim 28, wherein the processing device is further configured to receive with the processed marine vessel identification data one or more of the following: a serial number of the AIS transceiver; a nonce; a signature.

* * * * *